July 22, 1969   M. BERTH ET AL   3,456,312
METHOD OF MANUFACTURING A TARGET PLATE FOR USE IN A CAMERA TUBE
Filed Feb. 21, 1967   2 Sheets-Sheet 1
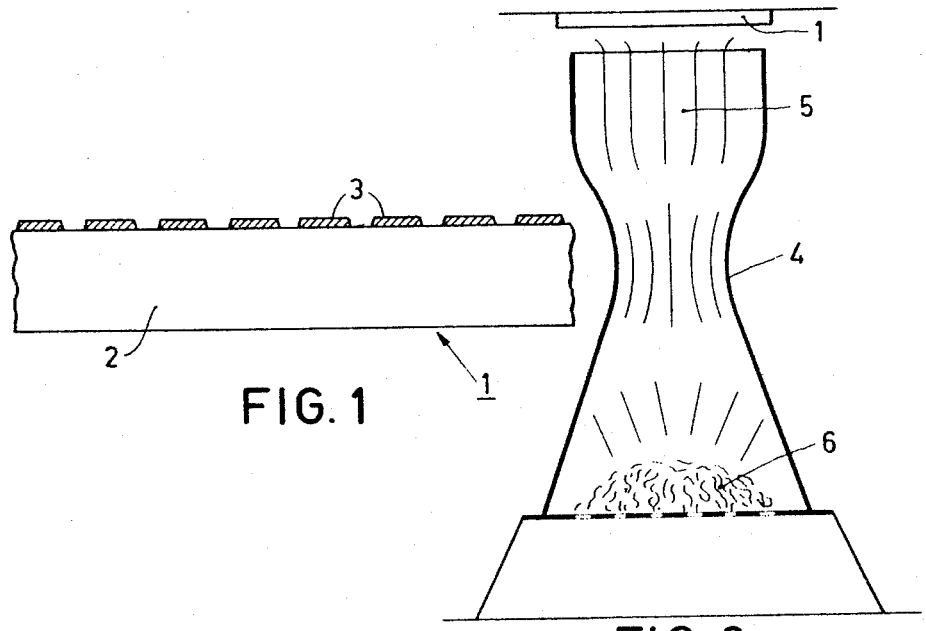
FIG. 1
FIG. 2
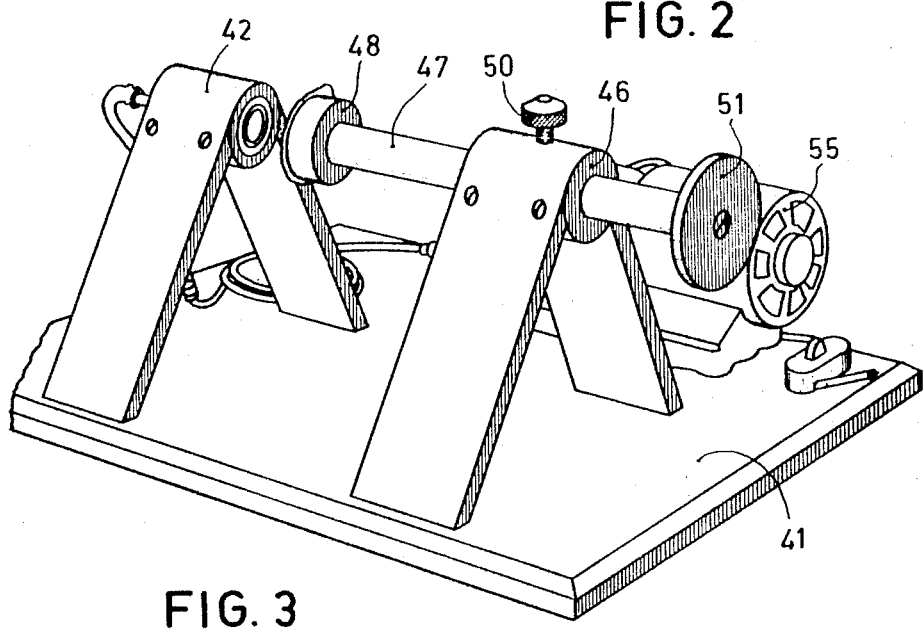
FIG. 3
INVENTORS
MICHEL BERTH
BERNARD L. P. JEAN
BY
Frank R. Trifari
AGENT July 22, 1969     M. BERTH ET AL     3,456,312
METHOD OF MANUFACTURING A TARGET PLATE FOR USE IN A CAMERA TUBE
Filed Feb. 21, 1967     2 Sheets-Sheet 2

INVENTORS
MICHEL BERTH
BERNARD L. P. JEAN
BY
AGENT

United States Patent Office 3,456,312
Patented July 22, 1969

3,456,312
METHOD OF MANUFACTURING A TARGET PLATE FOR USE IN A CAMERA TUBE
Michel Berth, Antony, Hauts de Seine, and Bernard Louis Pierre Jean, Suresnes, France, assignors, by mesne assignments, to U.S. Philips Corporation, New York, N.Y., a corporation of Delaware
Filed Feb. 21, 1967, Ser. No. 617,515
Claims priority, application France, Feb. 24, 1966, 50,961, 50,962
Int. Cl. B01j *17/00;* H01d *1/00*
U.S. Cl. 29—25.18                                    6 Claims

ABSTRACT OF THE DISCLOSURE

A method of manufacturing a target plate to be scanned by an electron beam for a camera tube in which a plate of semiconductive material is provided with a mosaic of domains separated by grooves. The domains are formed by diffusing a dopant into the semi-conductor forming np-junctions separated by the grooves. After the domains are formed, the surface of the plate is covered with a powdery insulating material which fills the grooves and covers the junctions. The junctions are exposed by removing the insulating material covering them.

---

The invention relates to a method of manufacturing a target plate to be scanned by an electron beam for use in a camera tube, in which one side of a plate of semiconductor material of a given conductivity type is provided by diffusing a dopant producing the opposite conductivity type into said side with a mosaic of domains of said opposite conductivity type separated from each other by grooves, while domains form np-junctions with the further material of the plate, and to a target plate thus manufactured.

During the scan the electron beam charges said junctions, which form an array of spaced rows of domains. These domains may be considered as insulators owing to the presence of the junctions. The electron beam does not charge the grooves between the rows, since the bottom of said grooves is conducting. As a result the electron beam is defocused, since the beam is repelled to the grooves by the charges of the domains. As a consequence thereof the television picture reproduced from the signals obtained by a camera tube with such a target plate tends to exhibit variations and gives the impression of being bleached, since contrast is lacking.

The invention provides a target plate and its manufacture, whereby such inconvenience is overcome.

The method according to the invention is characterized in that subsequent to the formation of the mosaic the side concerned of the plate is completely covered with a powdery insulating layer, the material of which is subsequently removed only from said domains.

The insulating layer is preferably obtained by precipitating magnesium-oxide fumes on the relevant side of the plate, which fumes are obtained by the combustion of magnesium in air. The insulating layer is preferably removed from said domains by pressing a thin plastic foil against the relevant side of the plate by means of an elastic membrane and by removing it thereafter.

The invention will be described with reference to the drawing, which shows one embodiment.

FIG. 1 is a sectional view of the plate treated by said method.

FIG. 2 shows the device suitable for carrying out said method.

FIG 3 is an elevation of a device for locally removing the insulating layer.

Figure 4:
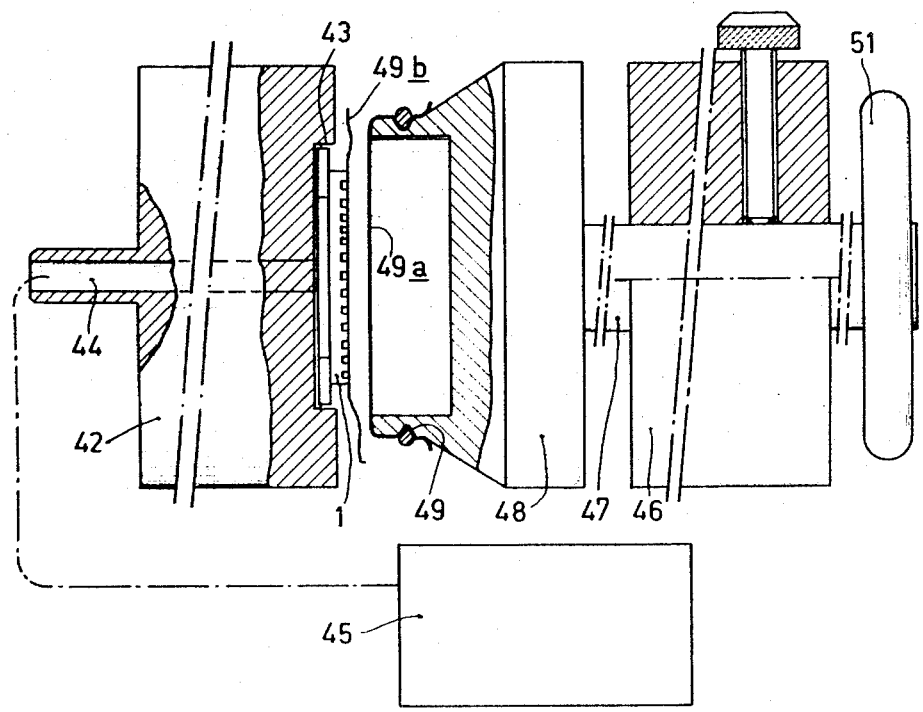
FIG. 4 is a schematic sectional view of the device of FIG. 3.

FIG. 1 is a cross sectional view of a target plate 1 comprising an uninterrupted support 2 of a semiconductor material of a given conductivity type, in this case n-type germanium. This plate is provided on the upper side with a thin layer of the same material, but of the opposite conductivity type, for example obtained by diffusing indium. This upper layer, in this case, of p-type conductivity, is subdivided by means of etched grooves, into a matrix of discrete domains 3 spaced apart by a distance of about 50μ from each other. These domains, together with the support 2, form approximately square np-junctions, which are separated from each other by straight grooves of a width of about 20μ and a depth of 10 to 15μ.

In order to avoid defocusing of the electron beam scanning the target plate 1 of the camera tube, the grooves between the domains 3 are filled out with insulating material. For this purpose, according to the invention, first the side of the plate 1 having the domains 3 is covered completely with an insulating layer. This may be carried out by means of the device shown in FIG. 2.

Subsequent to etching and drying the plate is disposed above a chimney 4, which serves for guiding and homogenizing magnesium-oxide fumes 5 obtained by the combustion of magnesium scales 6 in air. The condensation of the magnesium-oxide micro-crystals on the plate provides an insulating layer 7, which penetrates into the grooves.

The excess quantity of magnesium-oxide deposited on the plate and particularly on the domains may be removed by means of a device as illustrated in FIGS. 3 and 4.

The device shown in FIGS. 3 and 4 comprises a base 41, on which the various elements are mounted. A cylindrical member 42, arranged on a support, has, in one of its end faces, a recess 43 accommodating a metal disc to which the semiconductor plate 1 is stuck, the outer face of which forms the mosaic 3, covered with an insulating layer of magnesium-oxide. The recess 43 communicates through a duct 44 in the member 42 with a small exhaust pump 45. A sleeve 46 is arranged coaxially to the member 42; a rod 47 is displaceable in said sleeve in a substantially vertical direction and is provided at the end facing the member 42 with a bevelled, excavated head 48. The bevelled face has an opening 49. A thin latex membrane 49a of a thickness of 0.06 mm. is stretched across the front of the head 48 and held by means of a clamping strap in the notch 49. The other end of the rod 47 has a small rotatable wheel 51. The sleeve 46 has a set screw 50 for the rod 47.

The device operates as follows. The plate 1 with the fumed mosaic 3 is arranged in the recess 43, after which the pump 45 is actuated so that subatmospheric pressure holds the plate in place. A plastic foil 49b of a thickness of 0.08 mm., preferably having a layer of adhesive material is brought into contact with the mosaic. The head 48 with the thin latex membrane 49a is then moved forwardly so that the membrane 49a comes into contact with the outer face of the foil 49b of the synthetic resin. The dimensions of the membrane are such that it completely closes the recess 43. The exhaust apertures are arranged between the mosaic and the membrane. The membrane is pressed towards the mosaic and the intermediate foil 49b comes into contact with all domains of the mosaic. The pump is stopped for a short instant for disengaging the membrane, while the displaceable device is moved backwards, after which the pump is re-started for holding the plate in place. After the withdrawal of the plastic foil the powdery dielectric deposited on the front faces of the domains remains sticking to the foil, so that the domains become free of the dielectric without the insulating layer in the grooves being affected.

Figure 5:
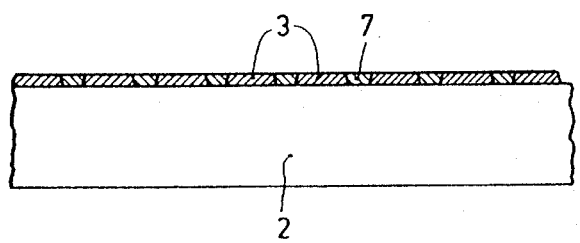
FIG. 5 is a sectional view of the final target plate.

A sectional view of the target plate thus manufactured is shown in FIG. 5. The grooves between the domains 3 are filled with powdery material 7, in this case, magnesium-oxide, whereas the outer faces of the domains 3 are clean.

What is claimed is:

1. In the method of manufacturing a target plate to be scanned by an electron beam for use in a camera tube, in which one face of a plate of semi-conductor material of a given conductivity type is provided with domains separated from each other by grooves which domains form np-junctions with the remaining material of the plate, said domains being formed by diffusing a dopant producing the opposite conductivity type in said face, the steps of depositing a powdery insulating layer onto the plate filling the grooves and covering the domains, and subsequently removing the material only from said domains.

2. A method as claimed in claim 1, wherein the insulting layer is obtained by the deposition of an oxide obtained by combustion.

3. A method as claimed in claim 2, wherein the insulating layer is obtained by exposing the side of the plate provided with the domains to magnesium oxide fumes obtained by the combustion of magnesium in air.

4. A method as claimed in claim 3, wherein the powdery material is removed from said domains by pressing a thin plastic foil against the face of the plate provided with the domains and subsequently removing the foil.

5. A method as claimed in claim 4, wherein the plastic foil is provided with an adhesive layer which is pressed against the side of the semiconductor plate covered with the powdery material.

6. A method as claimed in claim 4, wherein the plastic is pressed by subatmospheric pressure against the surface of the plate.

References Cited

UNITED STATES PATENTS

| 2,972,803 | 2/1961 | Koury et al. | 29—588 X |
| 3,040,416 | 6/1962 | Matlow et al. | 29—588 X |
| 3,151,379 | 10/1964 | Escoffery | 29—572 |
| 3,383,760 | 5/1968 | Schwartzman | 29—580 X |

PAUL M. COHEN, Primary Examiner

U.S. Cl. X.R.

29—577, 583; 117—8